United States Patent Office
3,257,422
Patented June 21, 1966

3,257,422
ETHER-ESTERS
Lee A. Miller, Kirkwood, Mo., assignor to Monsanto Company, a corporation of Delaware
No Drawing. Filed Feb. 11, 1964, Ser. No. 343,962
11 Claims. (Cl. 260—348)

This application is a continuation-in-part of copending application of Lee A. Miller, Serial No. 61,069, filed October 7, 1960, and now abandoned.

The present invention relates to ether-esters and more particularly provides new and valuable esters of certain dihydroxy compounds and ether-substituted acrylic acids, the method of preparing the same, and biological toxicant compositions comprising the new esters.

An object of this invention is the provision of new and valuable olefinic ether-esters. Another object of the invention is the provision of ether-esters of olefinic acids and dihydroxy compounds. A further object is the provision of diesterified dihydroxy compounds wherein the acid portions are derived from an ether-substituted acrylic acid. Still another objective of the invention is to provide, from bis(acetylenic acid compounds) olefinic ether-esters having biological toxicant utility, i.e., compounds which will serve as the essential effective ingredients of fungicidal, bactericidal and herbicidal compositions. The method of inhibiting the growth of microorganisms and/or of plant life wherein there are employed compositions comprising the presently provided olefinic ether esters is a further objective of the invention. A very important objective of the invention is the provision of olefinic-ether esters for use as monomers in the preparation of synthetic resins and plastics.

These and other objects hereinafter defined are provided by the invention wherein there are prepared new and valuable ether-esters of the formula

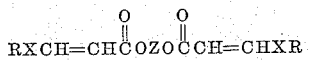

wherein R is selected from the class consisting of hydrocarbyl groups which are free of olefinic and acetylenic unsaturation and which contain from 1 to 12 carbon atoms and such groups carrying as substituent a radical selected from the class consisting of halogen and epoxy, X is selected from the class consisting of oxygen and sulfur, and Z is a bivalent hydrocarbon radical which is free from olefinic and acetylenic unsaturation and which contains from 2 to 15 carbon atoms.

The presently provided olefinic ether-esters are provided by the reaction of a hydroxy compound or of a thiol with a dipropiolate, substantially according to the scheme:

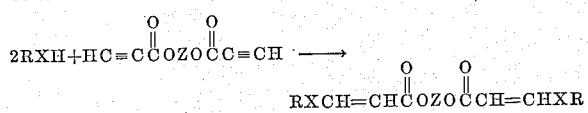

wherein R, X and Z are as defined above.

The presently useful hydroxy compounds or thiols may be aliphatic, cycloaliphatic, aromatic, aliphatic-aromatic, cycloaliphatic-aromatic or aliphatic-cycloaliphatic compounds which may or may not carry halogen and/or epoxy substitution, e.g., alcohols such as methanol, ethanol, isopropanol, butanol, pentanol, hexanol, octanol, decanol, dodecanol, cyclopentanol, cyclohexanol, 4-cyclohexylcyclohexanol, 2-methylcyclopentanol, 2-chloroethanol, 3,3-dibromopropanol, 2-fluoroethanol, 3-iodopropanol, 2-chloro-3-bromopropanol, 2,3-epoxy-4-methyl-2-pentanol, glycidol, 2-chloro-3,4-epoxy-2-methylbutanol, 4,4,3,3-tetrachlorobutanol, trichlorohexanol, dibromononanol, chlorododecanol, 8,8,8-trifluorooctanol, 2-chlorocyclohexanol, 4-(trifluoromethyl)cyclohexanol, 3,4-epoxycyclohexanol, 1-(epoxyethyl)-2-methylcyclohexanol, or 2,3-dibromocyclopentanol; aromatic hydroxy compounds such as phenol, α- or β-naphthol or 4-phenylphenol; aliphatic-aromatic hydroxy compounds such as benzyl alcohol, 4-tert-butylbenzyl alcohol, 2-phenylethanol, 3-(4-isopropylphenyl)propanol, 2-, 3- or 4-cresol, 2,3-, 3,4-, 3,5-, 2,6-, 2,4- or 2,5-xylenol, 4-(2-ethylphenyl)phenol, 2-hexylphenol β-butyl-α-naphthol, pentamethylphenol, 3,4-epoxy-4-phenyl-2-butanol; halogenated aromatic or aliphatic-aromatic hydroxy compounds such as 2-, 3- or 4-chloro-, bromo-, iodo-, or fluorophenol, 2,3-, 3,4-, 3,5-, 2,6-, 2,4- or 2,5-dichlorophenol; the corresponding dibromo-, diiodo- or difluorophenols; the tri-, tetra- or pentachlorophenols, the tri-, tetra- or pentabromophenols, the tri-, tetra- or pentaiodophenols; the tri-, tetra- or pentafluorophenols, mixed halophenols such as 2-chloro-4-bromophenol or 2,3-dibromo-4-iodophenol, 4-(4-chlorophenylphenol), α-chloro-β-naphthol, 4-(trifluoromethyl)phenol, 2,4-dichlorobenzyl alcohol, 3-bromo-4-tert-butylphenol, or 4-(2-chloroethyl)phenol; the cycloaliphatic-aromatic hydroxy compounds such as 4-chlorohexylphenol, 2-phenylcyclopentanol, or 2-chloro-4-cyclopentylphenol, etc.

The presently useful thiols may likewise be aliphatic, cycloaliphatic, aromatic, aliphatic-aromatic, aliphatic-cycloaliphatic or cycloaliphatic-aromatic, and they may or may not carry halogen substitution. As examples of such thiols may be mentioned methanethiol, ethanethiol, propanethiol; pentanethiol, octanethiol, dodecanethiol, 2-chloroethanethiol, dibromohexanethiol, 3-iodopropanethiol, 4-fluorobutanethiol, 2,3-epoxypropanethiol, benzenethiol, 4-ethylbenzenethiol, β-naphthalenethiol, 4-biphenylthiol, cyclohexanethiol, 2-phenylethanethiol, 4-cyclopentylbenzenethiol, 2-, 3- or 4-chloro-, bromo-, iodo- or fluorobenzenethiol, (2,3-dichlorophenyl)methanethiol, 2-chloro-4-methylcyclohexanethiol, or α-bromo-β-naphthalenethiol.

Dipropiolates which are useful for the preparation of the presently provided olefinic ether-esters by reaction with the above-defined hydroxy compounds or thiols are esters of propiolic acid and diols of the formula HOZOH wherein Z is a hydrocarbon radical which is free of olefinic and acetylenic unsaturation and which contains from 2 to 15 carbon atoms. As disclosed in the copending application of Lee A. Miller and John M. Butler, Serial No. 38,113, filed June 23, 1960, now U.S. Patent 3,082,242 the dipropiolates are prepared by the reaction of propiolic acid or an acyl halide thereof with the diols substantially according to the scheme when the acid is used:

The presently useful dipropiolates are those which are derived from hydrocarbondiols which are free of olefinic and acetylenic unsaturation and which contain from 2 to 15 carbon atoms. Examples thereof are the dipropiolates of ethylene glycol,
1,4-butanediol,
propylene glycol,
2-methyl-1,5-pentanediol, 1,3-pentanediol,
1,2-hexanediol,
2,3-dimethyl-1,4-pentanediol,
1,2-pentanediol,
2,5-heptanediol,
2-methyl-1,4-octanediol,
1,2-dodecanediol,
hydroquinone,
pyrocatechol,
resorcinol,
1,2-diphenyl-1,2-ethanediol,
3,6-dimethyl-o-xylene-α,α'-diol,
p,p'-diphenol,
1,2-naphthalenediol,
1,2-dimethyl-1,2-cyclohexanediol,
1,2-cyclopentanedimethanol,
cyclohexyl-1,2-ethanediol,
tert-amylresorcinol,
decahydro-2,3-naphthalenedimethanol,
2-ethyl-2-butyl-1,3-propanediol,
4,4'-isopropylidenedicyclohexanol,
2,2-dimethyl-1,3-propanediol,
4,4'-isopropylidenediphenol,
p-xylene-α,α'-diol,
tetramethyl-p-xylene-α,α'-diol, etc.

Reaction of the dipropiolate with the hydroxy compound or the thiol is generally conducted in the presence of a basic or acidic catalyst and in the presence of an inert liquid diluent or solvent. Preferably, an organic basic catalyst is employed. This is particularly desirable when the reaction is effected in the presence of a diluent. Examples of presently useful basic catalysts are, e.g., the heterocyclic nitrogen bases such as N-methylmorpholine, pyridine, quinoline, N-ethylpiperidine, picoline, quinaldine, 4-methylpyrimidine, or N-phenylpyrazole; the tertiary amines such as triethylamine, triamylamine, tri-tert-butylamine, N,N-dimethylaniline and N-benzyl-N-methylaniline; alkylene polyamines such as triethylenediamine; quaternary ammonium compounds such as benzyltrimethylammonium methoxide or tetrabutylammonium butoxide; alkali metal alkoxides such as sodium or potassium methoxide or propoxide, etc. The use of a diluent or solvent in the reaction will depend upon the nature of the reactants as well as upon the reaction conditions which are employed. When using a solid dipropiolate it is generally recommended that a diluent be employed; on the other hand, when the ester is liquid at the reaction temperature a diluent need not be used unless the ester and/or the hydroxy compound or thiol are extremely reactive. In that case, the use of an inert diluent will serve to moderate the reaction. The reactivity of the dipropiolate is usually a function of the molecular weight of the ester, the dipropiolates of the lower molecular weight glycols being most reactive. On the other hand, reactivity of the hydroxy or thiol component depends to a great extent on the carbon contents thereof as well as upon presence or absence of branched structures and/or halogen. In the aliphatic series, the branched structures appear to be less reactive; and in the aromatic series, the presence of halogen often increases reactivity. The quantity of the catalyst to be used also depends upon the nature of the propiolate and of the hydroxy or thiol compound; obviously the more reactive reactants will require less catalyst than will the more sluggish reactants. Whether or not a diluent is used will likewise regulate catalyst quantity. Also variable is the temperature at which reaction is effected; for, here again must be taken into consideration the nature of the reactants, catalyst quantity, and whether or not a diluent is used. While some of the present addition reactions can be conducted at ordinary room temperature or even at decreased temperatures, generally heating of the reaction mixture will be needed. All of these variables, i.e., catalyst quantity, use of diluent and temperature conditions can readily be arrived at by easy experimentation. Very rapid reaction at room temperature, as evidenced by rapid temperature rise will show the need for a diluent, and/or lower temperature, and/or less catalyst. Conversely, no reaction or only a very slow reaction at room temperature will indicate the use of more extreme conditions, i.e., extraneous heating and/or no diluent and/or more catalyst. Thus, arrival at optimum reaction conditions is simply a matter of routine procedure by one skilled in the art.

When the addition reaction has been effected in the absence of a solvent or diluent, generally no further treatment of the product is required previous to its use, say, a biological toxicant or as a monomer to be used for the preparation of polymers. When the reaction is effected in the presence of a diluent, the ether substituted diacrylate is recovered by simply distilling off the diluent.

To recapitulate: In the preparation of the present substituted diacrylates, the dipropiolate is contacted with the hydroxy compound or the thiol, preferably in the presence of a basic catalyst and in the presence or absence of an inert diluent or solvent at a temperature which may range from room temperature to refluxing, say, 125° C., and the resulting mixture is allowed to stand until formation of the ether-substituted diacrylate has occurred. The dipropiolate and the hydroxy compound or thiol are employed in substantially stoichiometric proportions in order to avoid need of separating unreacted material; however, an excess of either reactant may be employed and may even serve as solvent for the reaction. Extraneous, inert solvents or diluents which may be used are, e.g., benzene, toluene, xylene, hexane, dioxane, nitrobenzene, acetone, hexachloroethane, etc.

Ether-substituted diacrylates provided by the invention can be generally defined as bis(3-hydrocarbyloxyacrylates) or bis(3-hydrocarbylthioacrylates) of the diols, or such acrylates in which the hydrocarbyl radical carries halogen-substitution.

Types of compounds within the above defined scope include, by way of illustration and not by way of limitation:

Alkylenediol bis(3-alkyloxyacrylate)
Alkylenediol bis(3-arylthioacrylate)
Arylenediol bis(3-aryloxyacrylate)
Alkylenediol bis[3-(haloaryloxy)acrylate]
Alkylenediol bis[3-(epoxyalkyloxy)acrylate]
Cycloalkylenediol bis[3-(haloalkyloxy)acrylate]
4,4'-alkylidenediarylenediol bis[3-(arylthio)acrylate]

and numerous other ether-ester combinations which are more specifically illustrated hereinbelow.

Examples of some of the presently provided ether-substituted diacrylates and of the reactants from which they are prepared according to the invention are as follows:

Ethylene glycol bis(3-phenoxyacrylate) from phenol and the dipropiolate of the glycol.

1,4-butanediol bis(3-methoxyacrylate) from methanol and the dipropiolate of the diol.

Propylene glycol bis(3-phenylthioacrylate) from thiophenol and the dipropiolate of the glycol.

2-methyl-1,5-pentanediol bis(3-ethylthioacrylate) from ethanethiol and the dipropiolate of the diol.

2,2-dimethyl-1,3-pentanediol bis[3-(2,3-epoxypropylthio)acrylate] from 2,3-epoxypropanethiol and the dipropiolate of the diol.

1,3-pentanediol bis[3-(2-fluoroethoxy)acrylate] from 2-fluoroethanol and the dipropiolate of the diol.

1,2-hexanediol bis[3-(2,3-dichlorophenoxy)acrylate] from 2,3-dichlorophenol and the dipropiolate of the diol.

2,3-dimethyl-1,2-pentanediol bis[3-(3-iodopropoxy)acrylate] from 3-iodopropanol and the dipropiolate of the diol.

1,2-pentanediol bis(3-benzyloxyacrylate) from benzyl alcohol and the dipropiolate of the diol.

1,4-butanediol bis[3-(2-chloro-3,4-epoxy-2-methylpropoxy)acrylate] from 2-chloro-3,4-epoxy-2-methylbutanol and the dipropiolate of the diol.

2,5-heptanediol bis(3-isopropoxyacrylate) from isopropanol and the dipropiolate of the diol.

2-methyl-1,4-octanediol bis(3 - cyclohexyloxyacrylate) from cyclohexanol and the dipropiolate of the diol.

1,2-dodecanediol bis(3-cyclopentylthioacrylate) from cyclopentanethiol and the dipropiolate of the diol.

1,2-butanediol bis[3-(4-chloro-2-methylcyclopentyloxy)acrylate] from 4-chloro-2-methylcyclopentanol and the dipropiolate of the diol.

Propylene glycol bis[3-(3 - tolyloxy)acrylate] from m-cresol and the dipropiolate of the glycol.

Ethylene glycol bis[3-(4-butylphenoxy)acrylate] from 4-butylphenol and the dipropiolate of the glycol.

Ethylene glycol bis(3 - α - naphthyloxyacrylate) from α-naphthol and the dipropiolate of the glycol.

Hydroquinone bis(3 - dodecyloxyacrylate) from dodecanol and the dipropiolate of hydroquinone.

Pyrocatechol bis[3-(4-chlorophenylthio)acrylate] from 4-chlorobenzenethiol and the dipropiolate of pyrocatechol.

1,2-butanediol bis[3 - (3 - bromophenylthio)acrylate] from 3-bromobenzenethiol and the dipropiolate of the diol.

Resorcinol bis[3 - (tetrachlorobutoxy)acrylate] from tetrachlorobutanol and the dipropiolate of resorcinol.

Resorcinol bis[3-(4 - pentylbenzyloxy)acrylate] from 4-pentylbenzyl alcohol and the dipropiolate of resorcinol.

1,2-diphenyl - 1,2 - ethanediol bis[3-(2-ethylhexyloxy)acrylate] from 2-ethylhexanol and the dipropiolate of the diol.

3,6-dimethyl-o-xylene-α,α'-diol bis(3-butylthioacrylate) from butanethiol and the dipropiolate of the diol.

p,p'-Diphenol bis[3-(2 - phenylethoxy)acrylate] from 2-phenylethanol and the dipropiolate of the diphenol.

Hydroquinone bis[3-(2,3-epoxy-1-methyl-3-phenylpropoxy)acrylate] from 3,4-epoxy-4-phenyl-2-butanol and the dipropiolate of hydroquinone.

1,2-napthalenediol bis[3-(4-ethylphenylthio)acrylate] from 4-ethylbenzenethiol and the dipropiolate of the diol.

1,2-dimethyl-1,3-cyclohexanediol bis[3-(4-bromophenylthio)acrylate] from 4-bromobenzenethiol and the dipropiolate of the diol.

1,2-cyclopentanedimethanol bis[3-(4 - trifluoromethylphenoxy)acrylate] from 4-trifluoromethylphenol and the dipropiolate of the cyclopentanedimethanol.

Cyclohexyl-1,2-ethanediol bis[3-(4-biphenylthio)acrylate] from 4-biphenylthiol and the dipropiolate of the diol.

tert-Amylresorcinol bis{3-[(2,3-dichlorophenyl)methylthio]acrylate} from (2,3-dichlorophenyl)methanethiol and the dipropiolate of the amylresorcinol.

Decahydro-2,3-napthalenedimethanol bis[3-(3-bromo-4-butylphenoxy)acrylate] from 3-bromo-4-butylphenol and the dipropiolate of the dimethanol.

Pentadecane-1,2-diol bis[3-(3,4 - epoxycyclohexyloxy)acrylate] from 3,4-epoxycyclohexanol and the dipropiolate of the diol.

2-ethyl-2-butyl-1,3-propanediol bis[3-(2,4-diodobenzyloxy)acrylate] from 2,4-diodobenzyl alcohol and the dipropiolate of the diol.

4,4'-isopropylidenedicyclohexanol bis[3-(pentachlorophenylthio)acrylate] from pentachlorobenzenethiol and the dipropiolate of the dicyclohexanol.

2,2-dimethyl-1,3-propanediol bis[3-(3-fluoropropoxy)acrylate] from 3-fluoropropanol and the dipropiolate of the diol.

4,4'-isopropylidenediphenol bis(3-butoxyacrylate) from butanol and the dipropiolate of the diphenol.

p-Xylene-α,α'-diol bis(3-ethoxyacrylate) from ethanol and the dipropiolate of the diol.

Tetramethyl-p-xylene-α,α'-diol bis[3-(2-ethylhexylthio)acrylate] from 2-ethylhexanethiol and the dipropiolate of the diol.

Resorcinol bis(3-α-naphthyloxy)acrylate from α-naphthol and the dipropiolate of the resorcinol.

2,2-dimethyl-1,3-propanediol bis[3-(4 - tolyloxy)acrylate] from 4-cresol and the dipropiolate of the diol.

2,2-dimethyl-1,3-propanediol bis(3-cyclohexyloxyacrylate) from cyclohexanol and the dipropiolate of the diol.

1,6-hexanediol bis(3-pentyloxyacrylate) from pentanol and the dipropiolate of the diol.

1,5 - naphthalenedimethanol bis[3 - (2 - chloroethoxy)acrylate] from 2-chloroethanol and the dipropiolate of the diol.

1-ethyl-2-phenyl - 1,2 - butanediol bis(3-heptyloxyacrylate) from heptanol and the dipropiolate of the diol.

The presently provided ether-substituted diacrylates are stable, well-characterized compounds which are advantageously employed for a variety of agricultural and industrial purposes, e.g., as cross-linking, vulcanizing agents in the manufacture of synthetic rubbers from butadiene hydrocarbons, as polymerizable monomers, as copolymerizing monomers with vinyl compounds, e.g., with styrene, vinyl chloride or acrylonitrile to give polymers which are internally plasticized, and as biological toxicants, e.g., as fungistats and herbicides. They are particularly valuable as pre-emergent herbicides in that they possess a specificity of effect so that they can be used as de-weeders without adversely affecting the crop.

The presently provided compounds are noteworthy because, as shown in Example 6, they can serve as crab grass eradicants without killing or substantially injuring other grasses.

The invention is further illustrated by, but not limited to, the following examples:

*Example 1*

A mixture consisting of 15.6 g. (0.075 mole) of the dipropiolate of 2,2-dimethyl-1,3-propanediol, 5.8 g. (0.181 mole) of methanol, 100 ml. of benzene and 20 drops of N-methylmorpholine was refluxed for 12 hours. Concentration of the resulting reaction mixture under reduced pressure gave 20.3 g. of a light tan oil and distillation of the latter in a Vigreaux column gave the substantially pure 2,2-dimethyl - 1,3 - propanediol bis(3-methoxyacrylate), B.P. 165–7° C./0.2 mm., $n_D^{25}$ 1.4831, analyzing 57.05% carbon and 7.42% hydrogen as against 57.34% and 7.40%, the respective calculated values.

The 2,2-dimethyl-1,3-propanediol bis(3-methoxyacrylate) was found to be a selective pre-emergent herbicide for crab grass and pigweed, as shown in Example 6.

*Example 2*

A mixture consisting of 10.4 g. (0.05 mole) of the dipropiolate of 2,2 - dimethyl-1,3-propanediol, 11.5 g. (0.105 mole) of thiophenol, 10 drops of N-methylmorpholine and 100 ml. of benzene was heated at reflux for 12 hours. Subsequent concentration under reduced pressure gave 23.3 g. of an orange product. This was distilled to remove material boiling below 225° C./0.1 mm. There was thus obtained as residue the substantially pure 2,2 - dimethyl-1,3-propanediol bis(3-phenylthioacrylate), which analyzed as follows:

Calcd. for $C_{23}H_{24}O_4S_2$.—C, 64.50%; H, 5.64%; S, 14.95%. Found: C, 64.61%; H, 5.75%; S, 14.44%.

The 2,2-dimethyl - 1,3 - propanediol bis(3-phenylthioacrylate) was found to have a suppressing effect on growth of the cucumber leaf spot fungus at an 0.1% concentration.

*Example 3*

A mixture consisting of 4.2 g. (0.02 mole) of resorcinol dipropiolate (prepared by reaction of resorcinol with propiolyl chloride), 2.8 g. (0.03 mole, 50% excess) of phenol, 50 ml. of benzene and 5 drops of N-methylmorpholine as basic catalyst was heated at reflux for 12 hours. The resulting reaction mixture was then evaporated to give a black, viscous oil which was further dried at the oil pump for 3 hours to give the substantially pure resorcinol bis(3-phenoxyacrylate), analyzing 71.33% carbon and 4.47% hydrogen as against 71.63% and 4.51%, the respective calculated values. Infrared analysis showed the presence of the following structures:

CH, aromatic at 3100 cm.$^{-1}$
C=O at 1735 cm.$^{-1}$
C=C at 1650 cm.$^{-1}$
C=C, aromatic at 1600 cm.$^{-1}$ and 1490 cm.$^{-1}$
C—O-ester at 1235–1100 cm.$^{-1}$
Aromatic substituted ester at 900–680 cm.$^{-1}$

*Example 4*

A mixture consisting of 10.4 g. (0.05 mole) of the dipropiolate of 2,2-dimethyl-1,3-propanediol, 17.9 g. (0.11 mole, 10% excess) of 2,4-dichlorophenol, 2 drops of N-methylmorpholine and 100 ml. of benzene was prepared. An endothermic reaction was observed on mixing. The mixture was refluxed for 6 hours and then evaporated to give 24.0 g. (90% theoretical yield) of the substantially pure 2,2 - dimethyl-1,3-propanediol bis[3-(2,4-dichlorophenoxy)acrylate], a viscous, red-brown oil, which analyzed 51.95% carbon and 3.96% hydrogen as against 51.71% and 3.77%, the respective calculated values. Infrared analysis showed the presence of the following structures:

CH, aromatic at 3040 cm.$^{-1}$
CH, aliphatic at 2700–2900 cm.$^{-1}$
C=O at 1700 cm.$^{-1}$ and 1650 cm.$^{-1}$
C=C at 1600 cm.$^{-1}$
CH$_3$ plus CH$_2$ at 1470 cm.$^{-1}$
CH$_2$ at 1370 cm.$^{-1}$
C—O (Probably C—O—C or

at 1250 cm.$^{-1}$)
C—O—C, aliphatic at 1110 cm.$^{-1}$

The 2,2-dimethyl-1,3-propanediol bis[3-(2,4-dichlorophenoxy)acrylate] was found to have a suppressing effect on growth of tomato blight fungus when tested at an 0.1% concentration.

*Example 5*

To a mixture consisting of 20.8 g. (0.1 mole) of the dipropiolate of 2,2-dimethyl-1,3-propanediol, 5 drops of N-methylmorpholine and 200 ml. of benzene there was added dropwise, with stirring, 14.8 g. (0.2 mole) of glycidol. The whole was stirred at room temperature for 18 hours and subsequently evaporated to give as residue the substantially pure 2,2-dimethyl-1,3-propanediol bis[3-(2,3-epoxypropoxy)acrylate], a dark red oil.

*Example 6*

This example shows evaluation of the 2,2-dimethyl-1,3-propanediol bis(3-methoxyacrylate) of Example 1 as a preemergent herbicide. Briefly, the chemical is applied in spray form to soil seeded to representative grasses and broad-leaf plants.

Aluminum pans, 13″ x 9″ x 2″, were filled with a good grade of top soil which had been screened through a ¼″ wire mesh and mixed with sand in a preparation of two parts of the top soil to one part of the sand. The soil surface was then compacted to a depth of ⅜″ from the top of the pan. Twenty seeds each of morning glory, wild oat, foxtail, crab grass, rye grass, radish, sugar beet, tomato, wild buckwheat, and pigweed were then scattered on the soil surface and covered with soil to the pan top.

The present herbicidal solution was prepared by dissolving 0.4 g. of the 2,2-dimethyl-1,3-propanediol bis(3-methoxyacrylate) in 20 cc. of acetone. Ten ml. of this solution was diluted with water to 30 cc. Application of this quantity of the solution to said pans is calculated to correspond to the use of 25 lbs. of the test compound per acre. The planted pans were then placed in an exhaust hood and sprayed first with 30 cc. of an aqueous solution of a liquid fertilizer and 0.1% solution of octamethyl pyrophosphoramide. The liquid fertilizer was employed to give a uniform nutrition level and the amide was employed to prevent insect injury. Two pans were then respectively sprayed with the 25 lb. per acre solution of the test compound. One of the pans which had been planted and treated with the liquid fertilizer and octamethyl pyrophosphoramide in the same manner was set aside to be used as a "blank." The three pans were then placed in ½″ of water and allowed to absorb moisture through perforated bottoms until the soil surface was completely moist. The pans were then transferred to a wet sand bench in the greenhouse, and maintained there for ten days under ordinary conditions of sunlight and watering.

Observation of the pans at the end of that time showed that those which had been sprayed with the 25 lb. per acre solution of the bis(methoxyacrylate) showed complete suppression of crab grass and pigweed; however, the radish, sugar beet, morning glory, wild buckwheat, wild oat, rye grass and tomato had emerged and showed no evidence of phytotoxicity. The foxtail showed slight injury. Also, all of the types of seeds which had been planted in the pan which had not been sprayed with the bis(methoxyacrylate) had emerged and the plants were in excellent condition. Accordingly, when used at the rate of 25 lbs. per acre, the present bis(methoxyacrylate) is an unusually effective preemergent herbicide in that it prevents emergence and growth of crab grass and pigweed without having any adverse effect on wild oat, rye grass, and the broadleaf plants which were tested.

Employing the same testing procedure, the 2,2-dimethyl-1,3-propanediol bis[3-(2,4-dichlorophenoxy)acrylate] of Example 4 was also found to give complete suppression of crab grass. However, with this compound there was not the pronounced specificity which was exhibited by the bis(3-methoxyacrylate) of Example 1; for in addition, foxtail was completely suppressed, wild oat was moderately injured, and morning glory, rye grass and buckwheat were slightly injured. There was no effect on radish, tomato and pigweed.

*Example 7*

The preemergent herbicidal properties of the following compounds were compared according to the procedure described below:

(I) 2,2 - dimethyl - 1,3 - propanediol bis(2 - methoxyacrylate)
(II) 2,2 - dimethyl - 1,3 - propanediol bis[2 - (2,4 - dichlorophenoxy)acrylate]
(III) Methyl-3-(4-chlorophenylthio)-2-chloroacrylate
(IV) Methyl-β-2,6-dimethylphenoxyacrylate
(V) Butyl butoxyacetate
(VI) 2-ethylhexyl 2-ethylhexyloxyacetate
(VII) Methyl 3-(phenylthio)-2-chloroacrylate Aluminum pans were level filled with a good grade of top soil which had been screened through a ¼″ wire mesh. The soil surface was then compacted to a depth of ⅜″ from the top of the pan. A pre-determined number of seeds each of crab grass and radish were then scattered on the soil surface and covered with soil to the pan top.

The planted pans, except for controls, were sprayed with an aliquot of an organic solvent containing the chemical to be tested. The tests were made at rates equivalent to 25 lbs. per acre. After spraying, the pans were placed on sand in a bench in the greenhouse and the bench flooded with water to ½″ above the sand level. The test pans of soil were allowed to absorb moisture through the perforated bottom until the surface is about ½ moist. The excess water was then drained off below the bench sand level. The surfaces of the test pans rapidly became completely moist by capillary action and were maintained adequately wet by sub-irrigation for the two week test period. Observation of the pans at the end of that time gave the following results:

| Test Compound | Crabgrass | Radish |
|---|---|---|
| I | 3 | 0 |
| II | 3 | 0 |
| III | 3 | 3 |
| IV | 0 | 0 |
| V | 0 | 0 |
| VI | 0 | 0 |
| VII | 0 | 0 |
| Control | 0 | 0 |

In the above table, severe suppression of emergence and growth is indicated by the figure 3 and no suppression and no injury by 0. The data show that of the above test compounds, only Compounds I, II, i.e., the 2,2-dimethyl-1,3-propanediol bis(2-methoxyacrylate) and the 2,2-dimethyl-1,3-propanediol bis[2-(2,4-dichlorophenoxy)acrylate] suppress emergence and growth of the crabgrass without in any way harming the emergence and growth of radish, a typical broad-leafed plant.

I claim:
1. A compound of the formula

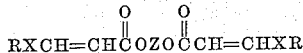

wherein R is selected from the class consisting of hydrocarbon, halohydrocarbon, and epoxyhydrocarbon having from 1 to about 12 carbon atoms and being free from olefinic and acetylenic unsaturation, X is selected from the class consisting of oxygen and sulfur, and Z is a bivalent hydrocarbon having from 2 to 15 carbon atoms and being free from olefinic and acetylenic unsaturation.

2. A compound as described in claim 1 wherein R is hydrocarbon having from 1 to 12 carbon atoms and is free of olefinic and acetylenic unsaturation, X is oxygen, and Z is alkylene having from 2 to about 15 carbon atoms.

3. A compound as described in claim 1 wherein R is halohydrocarbon having from 1 to 12 carbon atoms and is free of olefinic and acetylenic unsaturation, X is oxygen, and Z is alkylene having from 2 to 15 carbon atoms.

4. A compound as described in claim 1 wherein R is hydrocarbon having from 1 to 12 carbon atoms and is free of olefinic and acetylenic unsaturation, X is sulfur, and Z is alkylene having from 2 to 15 carbon atoms.

5. A compound as described in claim 1 wherein R is epoxyhydrocarbon having from 2 to 12 carbon atoms and is free of olefinic and acetylenic unsaturation, X is oxygen, and Z is alkylene having from 2 to 15 carbon atoms.

6. A compound as described in claim 1 wherein R is hydrocarbon having from 1 to 12 carbon atoms and is free of olefinic and acetylenic unsaturation, X is oxygen, and Z is arylene having from 6 to 12 carbon atoms.

7. 2,2 - dimethyl - 1,3 - propanediol bis(3 - methoxyacrylate).

8. 2,2 - dimethyl - 1,3 - propanediol bis(3 - phenylthioacrylate).

9. Resorcinol bis(3-phenoxyacrylate).

10. 2,2 - dimethyl - 1,3 - propanediol bis[3 - (2,4 - dichlorophenoxy)acrylate].

11. 2,2 - dimethyl - 1,3 - propanediol bis[3 - (2,3-epoxypropoxy)acrylate].

No references cited.

WALTER A. MODANCE, *Primary Examiner.*

NORMA S. MILESTONE, *Examiner.*